US005196131A

United States Patent [19]

Baumgartner et al.

[11] Patent Number: 5,196,131

[45] Date of Patent: Mar. 23, 1993

[54] SOAP BARS WITH THE APPEARANCE OF FINISHED WOOD GRAIN

[75] Inventors: Erika M. Baumgartner, Freeport; Philip Greenberg; Harold A. Miller, both of White Plains, all of N.Y.

[73] Assignee: The Mearl Corporation, Ossining, N.Y.

[21] Appl. No.: 617,544

[22] Filed: Nov. 26, 1990

[51] Int. Cl.[5] ........................ C11D 17/00; C04B 14/00

[52] U.S. Cl. .................................... 252/89.1; 106/418; 252/90; 252/DIG. 5; 252/DIG. 16

[58] Field of Search ................ 106/418; 252/DIG. 16, 252/89.1, DIG. 5, 90

[56] References Cited

U.S. PATENT DOCUMENTS 3,656,982 4/1972 Chapman et al. .................. 106/418
3,711,308 1/1973 Brand et al. ........................ 106/291
3,874,890 4/1975 Bernhard et al. .................. 106/418
3,926,659 12/1975 Bernhard et al. .................. 106/418

FOREIGN PATENT DOCUMENTS 1959998 7/1971 Fed. Rep. of Germany .

*Primary Examiner*—A. Lionel Clingman
*Assistant Examiner*—William S. Parks
*Attorney, Agent, or Firm*—Ostrolenk, Faber, Gerb & Soffen

[57] ABSTRACT

A soap bar having the appearance of a polished wood grain is prepared by mixing the soap formulation with an iron oxide coated micaceous pearlescent pigment and extruding the combination such that the iron oxide coated micaceous pearlescent pigment is oriented generally unidirectionally.

5 Claims, No Drawings

SOAP BARS WITH THE APPEARANCE OF FINISHED WOOD GRAIN

BACKGROUND OF THE INVENTION

Soap bars exhibiting a wood grain like appearance are known. They have been prepared by mixing conventional pigments with the soap formulation which is then processed into a bar in the conventional fashion. Such soap bars, however, have a dull appearance and the wood grain pattern is flat so that the bars do not resemble the appearance of a genuine wood finish. More particularly, such soap bars resemble some of the veneers commonly used in furniture finishing in which the wood pattern of the veneer is obtained by a printing process. It is both dull and flat and does not have the appearance of wood.

Wood for structural, furniture and other finishing processes is obtained from the trunks and heavy branches of trees, specifically the xylem portion, which is the interior of the tree. The wood consists largely and usually of highly oriented fibers, primarily cellulose, along with other natural products, frequently with variations in color. It is this highly oriented cellulose fiber structure which imparts the characteristic appearance to the wood.

If a sample of finished wood with a flat surface is examined, it can be seen that the pattern of light and dark areas show some depth, and as the angle of observation is changed with respect to the light, some shifts in the pattern, albeit slight, can be seen. Some types of wood, for example American walnut, show this depth pattern to a greater extent than others. Further, wood samples with flat surfaces that have been given a finish with an appropriate lacquer have high gloss while unfinished wood may appear dull because of light scattering by the surface.

Japanese patent publication 54 26807 describes soaps having a pearly gloss and a wood grain pattern which are prepared by extruding a soap formulation containing pearly substances through nets or porous sheets and then molding. The wood grain pattern is obtained using conventional pigments and the pearly luster achieved using titanium dioxide coated mica, bismuth oxychloride and fish scales. It will be appreciated that natural wood grain is not pearly in appearance and an article made to appear pearly does not show a natural finished wood grain effect. Thus the appearance of a polished wood article and an object made of mother-of-pearl are entirely different.

It will therefore be appreciated that the prior art has not been able to produce soap bars which bear a strong resemblance to polished or finished wood. Accordingly, it is the object of this invention to provide a process for producing a soap bar bearing a strong resemblance to polished or finished wood and to provide the resulting extruded soap bars. This and other objects of the invention will become apparent to those of ordinary skill in this art from the following detailed description.

SUMMARY OF THE INVENTION

This invention relates to soap bars with the appearance of a finished wood grain and the method by which soap bars are produced. More particularly, extruded soap bars with the appearance of a finished wood grain are obtained by combining a soap formulation with iron oxide coated micaceous nacreous pigment and then extruding the combination such that the iron oxide coated micaceous pigment is oriented generally unidirectionally.

DESCRIPTION OF THE INVENTION

Extruded soap bars are conventionally prepared by processing a soap formulation containing the soap forming components through an amalgamator, refiner, plodder, cutter and press. The amalgamator and refiner primarily mix the components and make the soap formulation homogeneous. The plodder is essentially an extruder from which an extruded soap is obtained in continuous form. The continuous extruded soap is then cut into appropriate lengths to approximate the desired bar size by the cutter, and the press is used to shape the soap into its final configuration. The present invention utilizes the foregoing conventional process steps with two modifications. First, a wood grain appearance amount of an iron oxide coated micaceous nacreous pigment is included in the soap formulation components and secondly, the formulation is extruded in such a way that the iron oxide coated micaceous nacreous pigment in the extrudate is oriented generally in a uniaxial direction.

The usual soap forming mixtures currently used to produce a translucent or opaque soap bar can be used in the present invention. It is preferred to use a translucent soap base formulation in the present invention because the resulting wood grain appearance will be brighter and sharper. Opaque bases can be used, however, if free of pigmentary titanium dioxide. To this conventional soap formulation is added an iron oxide coated micaceous nacreous pigment in an amount appropriate to produce the desired finished wood grain appearance. In general this amount is in the range of about 0.3 to 5% and preferably about 0.4 to 1%. The iron oxide coated micaceous nacreous pigments are well known and many are commercially available. Typical examples are those products of the Mearl Corporation sold under the trademarks Cloisonne Gold Bronze, Cloisonne Copper, Cloisonne Rouge Flambe, Cloisonne Super Bronze, Cloisonne Super Copper and Cloisonne Super Rouge. When appropriate for the wood that is being simulated, the pigment can be a combination metal oxide coated micaceous pigment in which the metal oxides are iron oxide and titanium dioxide. Examples of such pearlescent pigments include Cloisonne Gold and Cloisonne Orange which are available from the Mearl Corporation.

Some woods have black or dark striations and to stimulate this appearance, it is advantageous to include a black pigment or a pearlescent pigment which has a black pigment adhering to its surfaces in the soap formulation. Suitable black pigments are carbon black and black iron oxide which can be used alone or adhering to an iron oxide coated micaceous pigment. An example of an iron oxide coated mica nacreous pigment containing black iron oxide is Cloisonne Nu-Antique Copper. Pearlescent pigments which have some blackness or darkness in appearance due to the structure of the pearlescent pigment can also be used. They include adsorbed organic dyes having a dark color, reduced forms of $TiO_2$, $MnO_2$, $Fe_2O_3$ and the like. It will be appreciated that the term "pearlescent" as used in this specification means a pearl-like or nacreous luster as distinct from a pearl appearance. To further adjust the soap base formulation for the particular color effects desired, supplemental addition of small amounts of conventional soap colorants may be employed.

If desired, a suitable fragrance can be employed and when used is generally present in an amount of about 0.5 to 5%.

The soap base formulation, iron oxide nacreous pigment and optional fragrance component are amalgamated and homogenized in the conventional soap making fashion. If this mixture was then extruded in the conventional fashion, the desired wood grain appearance would not be achieved. The mixture would not yield a good orientation since soap formulations intended for extrusion are largely liquid crystals in structure and do not provide viscosity conditions which lead to good orientation of the iron oxide coated mica platety particles. The particles must be oriented in a generally unidirectional manner. Thus, in a conventional xyz plot, with x as the abscissa, z as the ordinate, and y axis perpendicular to the plane of the paper, the direction of extrusion is the positive x-axis. The pearlescent platelets will be oriented in the positive x-axis direction. However, the platelets themselves will have different orientations around the x-axis, bearing in mind that the long axis of the extruded soap bar is the x-axis. As a result, when the surface of the soap bar in the xy plane is illuminated in the xz plane, very little change in reflectivity will be seen with changing angles of illumination or viewing. When the same surface is illuminated in the yz plane, some specular reflection will be seen at a variety of angles of illumination and viewing. As a result, the desired appearance will be achieved.

In order to achieve the necessary orientation, the soap formulation is extruded through a perforated plate. The open area of the plate occupies about 20 to 40%, preferably about 25% to 35%, of the total surface area of the plate. The openings in the plate have a size of about 0.3 to 2.0 mm and are preferably about 0.5 to 1.5 mm. It is possible to obtain some orientation with perforated plates having larger open areas or proportions of open areas and even without a perforated plate, but the wood grain patterns realized are poor and do not have the attractive appearance of good wood. Limiting the open area of this perforated plate can increase the back pressure for extrusion, but this is necessary in order to achieve the desired appearance. If desired, further variations in the pattern being obtained can be realized by the use of an additional plate or plates beyond the perforated plate where the added plate(s) have a totally different pattern such as large slotted disks. This makes it possible to achieve an extruded soap bar pattern with orientation variations similar to natural wood. The extrusion is carried out at a generally elevated temperature, as is conventional, of about 40°-50° C. in the case of a translucent base soap formulation and 55°-75° C. in the case of an opaque soap base formulation. A lower temperature is used in the former case because of the lower softening point of the composition due to the presence of additional polyhydroxy compounds.

After exiting the extruder, the soap is cut into appropriate sizes and each of the bars is shaped using a mold in a press, as is conventional.

In order to further illustrate the present invention, various examples are given below. In these examples, as well as in the rest of this specification and claims, all parts and percentages are by weight and all temperatures and degrees centigrade unless otherwise indicated.

EXAMPLE 1

Soap with mohagany wood grain appearance.

Chips of an opaque soap base containing 85% anhydrous fatty acid sodium soap, 1% glycerine and 13% water were employed. The anhydrous soap portion of the chips contained 15% coconut fatty acid sodium soap and 85% hydrogenated tallow fatty acid sodium soap. The chips (990 gm) were combined with 5 grams of sandlewood fragrance and 5 grams of an iron oxide coated mica pigment which consisted of mica platelets with an average particle size of 20 microns having a coating of $Fe_2O_3$ and $TiO_2$ on its surfaces. The approximate composition of the pigment was 53% mica, 43% $Fe_2O_3$ and 4% $TiO_2$.

The mixture was first amalgamated using the amalgamator part of a 3 inch (ca. 7.62 cm) Simplex Mazzoni Soap Extruder. The mixture was then refined by being passed twice through a Mazzoni Laboratory Plodder, which is essentially an extruder having a 3 inch inside diameter. The plodder was then fitted in sequence at the end of the extrusion screw with a perforated plate which contained 75 one millimeter diameter openings per square inch, a compression nozzle and a $\frac{3}{4}$"×1$\frac{3}{8}$" (ca. 1.9×3.5 cm) rectangular die. The compression nozzle was heated to about 75° C. The refined soap strands were collected and returned to feed hopper of the plodder and a soap log having a rectangular cross section was extruded. The log was divided into billets of about 10–12 cm in length and then subjected to pressing in a soap press to form soap bars. The resulting soap bars had the characteristic wood grain appearance of finished mahogany.

COMPARATIVE EXAMPLE 1A

Example 1 was repeated using 984.6 grams of the opaque soap base chips, 3.7 grams of a titanium dioxide coated mica pigment, 0.2 grams of a pigmentary iron oxide (Cosmetic Iron Oxide Brown B-3279 from H Kohnstamm), 1.5 grams of a second pigmentary iron oxide (Cosmetic Iron Oxide Burnt Sienna T-2817R from H Kohnstamm), and 10 grams of fragrance. The final soap bars had weak wood patterns and resembled a print of a wood pattern rather than displaying the depth of real wood.

EXAMPLE 2

Soap with appearance of American walnut wood grain

A translucent soap formulation in the form of chips containing 83% anhydrous soap, 4% glycerine and 13% moisture were used in an amount of 952 grams. They were combined with 44.5 grams of fragrance; 2.3 grams of a first nacreous pigment and 1.2 grams of a second nacreous pigment. The first nacreous pigment consisted of 20 micron mica platelets coated with $Fe_2O_3$ and $TiO_2$ such that the approximate composition of the pigment was 65% mica, 32% $Fe_2O_3$ and 3% $TiO_2$. A second nacreous pigment was the nacreous pigment used in Example 1 which additionally contained 15% by weight of black iron oxide.

The formulation was amalgamated and the mixture refined three times through the Mazzoni Plodder using the perforated plate described in Example 1. The refined soap strands were returned to the plodder, leaving the perforated plate in place and inserting a slotted disk with the slots oriented vertically. The slotted disk had nine slots of 6 millimeters in width and lengths varying from 7 cm at the center of the disk to 1.7 cm near the edge. The disk caused some dark areas in the extruded soap, due to disorientation of the platy particles of the pigment which contains some black iron oxide.

The compression nozzle was clamped in place and fitted with a plate having a $\frac{3}{4}$ inch (ca. 1.9 cm) diameter hold to facilitate packing of the compression cone. The compression nozzle was heated to about 50° C. and when the extruded soap rod was cohesive, the plate used for packing was replaced by a die-disk having a $\frac{3}{4}'' \times 1\frac{3}{8}''$ rectangular opening. The extruded rectangular soap log was cut into billets of appropriate size which were then pressed into soap bars having the characteristic wood grain appearance of finished American walnut.

COMPARATIVE EXAMPLE 2A

The procedure of Example 2 was followed except that the pigments were replaced with 1.18 grams of a first pigmentary iron oxide (Cosmetic Iron Oxide Umber A-8534 from H. Kohnstamm), 0.18 grams of a second pigmentary iron oxide (Cosmetic Iron Oxide Black A-8214 from H. Kohnstamm) and 2.14 grams of a titanium dioxide coated mica nacreous pigment. The resulting soap bars had a flat appearance giving no impression of the wood. In contrast, the bars of Example 2 had a rich, three dimensional polished wood appearance.

EXAMPLE 3

Maple Wood grain appearance soap bar

A translucent soap base (968.5 grams) was combined with 20 grams of fragrance, 10 grams of a titanium dioxide coated mica nacreous pigment containing 77% mica and 23% $TiO_2$ and 1.5 grams of an iron oxide coated nacreous pigment containing 61% mica, 35% $TiO_2$ and 4% $Fe_2O_3$. The procedure of Example 2 was followed employing two passes using the perforated disk followed by one pass using the stainless steel screen with 0.5 mm openings. During extrusion, the screen support and perforated disk were used. The resulting soap bars had the characteristic wood grain appearance of finished and polished maple.

EXAMPLE 4

Oak appearing soap bar

Combined were 978.4 grams of a translucent soap base, 15 grams fragrance, 4 grams of a nacreous pigment containing 61% mica, 35% $TiO_2$ and 4% $Fe_2O_3$, 2 grams of a nacreous pigment having about 46% mica, 47% $TiO_2$ and 7% $Cr_2O_3$ and 0.6% of a nacreous pigment of about 65% mica, 32% $Fe_2O_3$ and 3% $TiO_2$. The procedure of Example 2 was followed to produce soap bars having the characteristic wood grain appearance of finished oak.

EXAMPLE 5

French walnut appearing soap

Combined were 975.5 grams of a translucent soap base, 20 grams fragrance, 2.5 grams of an iron oxide coated mica nacreous pigment having about 53% mica, 43% $Fe_2O_3$ and 4% $TiO_2$ combined with 15% by weight of black iron oxide, and 2% of a nacreous pigment of about 55% mica, 41% $TiO_2$ and 4% $Fe_2O_3$. The procedure of Example 3 was followed to achieve the appearance of a French walnut.

COMPARATIVE EXAMPLE 5A

The procedure of Example 5 was followed except that the pigments were replaced by 3.18 grams of a titanium dioxide coated mica, 0.38 grams of a first pigmentary iron oxide (Cosmetic Iron Oxide Black A-8214) 0.91 grams of a second pigmentary iron oxide (Cosmetic Iron Oxide Umber A-8534) and 0.08 grams of a third pigmentary iron oxide (Cosmetic Iron Oxide Yellow T-3506 from H. Kohnstamm). The soap bars produced had a flat and muddy brown appearance in contrast to the bars of Example 5 which displayed a rich, deep brown and lustrous appearance of finished French walnut.

Various changes and modifications can be made to the process and products of the present invention without departing from the spirit and scope hereof. The various embodiments disclosed herein were for the purpose of further illustrating the invention but were not intended to limit it.

What is claimed is:

1. A soap bar having the appearance of a polished wood grain containing a generally unidirectionally oriented iron oxide coated micaceous nacreous pigment.

2. The soap bar of claim 1 containing about 0.3–5% of said pigment.

3. The soap bar of claim 2 comprising an opaque soap formulation free of pigmentary titanium dioxide and containing 0.4–1% of said iron oxide coated mica nacreous pigment.

4. The soap bar of claim 1 comprising an opaque soap formulation and said nacreous pigment, said soap formulation being free of pigmentary titanium dioxide.

5. The soap bar of claim 1 comprising a translucent soap formulation and said nacreous pigment.

* * * * *